(12) United States Patent
Lee

(10) Patent No.: US 10,936,165 B2
(45) Date of Patent: *Mar. 2, 2021

(54) SYSTEM AND METHOD FOR CALCULATING METRICS

(71) Applicant: INTERNATIONAL BUSINESS MACHINES CORPORATION, Armonk, NY (US)

(72) Inventor: Alan Y. Lee, Oakland, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/819,345

(22) Filed: Mar. 16, 2020

(65) Prior Publication Data

US 2020/0218407 A1 Jul. 9, 2020

Related U.S. Application Data

(63) Continuation of application No. 15/059,706, filed on Mar. 3, 2016, now Pat. No. 10,678,399, which is a continuation of application No. 14/620,640, filed on Feb. 12, 2015, now Pat. No. 10,684,741.

(51) Int. Cl.
*G06F 3/0482* (2013.01)
*G06F 16/245* (2019.01)
*G06F 3/0481* (2013.01)
*G06F 7/60* (2006.01)

(52) U.S. Cl.
CPC ........ *G06F 3/0482* (2013.01); *G06F 3/04817* (2013.01); *G06F 7/60* (2013.01); *G06F 16/245* (2019.01)

(58) Field of Classification Search
CPC ...... G06F 3/0482; G06F 3/04817; G06F 7/60; G06F 16/245; G06F 3/04886; G05B 2219/35261; G05B 2219/35262
See application file for complete search history.

(56) References Cited

U.S. PATENT DOCUMENTS

| | | | |
|---|---|---|---|
| 5,603,021 A * | 2/1997 | Spencer | G06F 40/18 |
| 8,595,217 B2 | 11/2013 | Phibbs et al. | |
| 8,630,940 B1 | 1/2014 | Walters | |
| 2002/0198876 A1 * | 12/2002 | Zielinski | G06F 9/45512 |
| 2004/0104945 A1 | 6/2004 | Kearns et al. | |
| 2005/0033783 A1 | 2/2005 | de Brebisson | |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Phuong H Nguyen
(74) *Attorney, Agent, or Firm* — James W. Kappos

(57) ABSTRACT

A computer-implemented method, computer program product, and system is provided for creating calculated metrics. In an implementation, a method may include providing a user interface including a calculator with a plurality of buttons. The method may also include receiving, via the user interface, a selection of at least one stored metric and a selection of at least one operation, resulting in a new metric. The method may further include storing the new metric with a new metric name.

14 Claims, 9 Drawing Sheets

(56) References Cited

U.S. PATENT DOCUMENTS

| | | |
|---|---|---|
| 2009/0157711 A1 | 6/2009 | Baer et al. |
| 2013/0219312 A1 | 8/2013 | Abi-Saleh |
| 2013/0318236 A1 | 11/2013 | Coates et al. |
| 2014/0067407 A1 | 3/2014 | Sathe et al. |
| 2016/0239160 A1 | 8/2016 | Lee et al. |
| 2016/0239183 A1 | 8/2016 | Lee et al. |

OTHER PUBLICATIONS

Disclosed Anonymously, ip.com, "User Interface Data Visualization and Framework for Diabetes Care," ip.com No. IPCOM000238307D, Aug. 15, 2014, pp. 1-19.

Motorola, Inc., Anant Athale, Tom Tirpak, ip.com, "One GUI: Method and System for User Interface Synthesis," ip.com No. IPCOM000136583D, May 23, 2006, Motorola, Inc. May 23, 2006, pp. 1-11.

Alsmadi et al., "The Introduction of Several User Interface Structural Metrics to Make Test Automation More Effective," The Open Software Engineering Journal, 2009, 3, 72-77.

IBM Appendix P, Applications to be Treated as Related, Mar. 16, 2020, pp. 1-2.

\* cited by examiner

SYSTEM AND METHOD FOR CALCULATING METRICS

BACKGROUND

The present disclosure generally relates to calculating metrics, and more particularly relates to systems and methods for creating and storing calculated metrics.

BACKGROUND

Analytics software may make use of metrics fairly often. While many analytics software often provide standard metrics based upon collected data, sometimes users may be required to perform mathematical calculations on the existing standard metrics to create new metrics. Often times, creating a new metric based upon the standard metric involves manually manipulating the standard metrics with mathematical calculations. This may be very time consuming and error prone.

SUMMARY OF DISCLOSURE

According to an implementation, a computer-implemented method may include providing a user interface including a calculator with a plurality of buttons. The method may also include receiving, via the user interface, a selection of at least one stored metric and a selection of at least one operation, resulting in a new metric. The method may further include storing the new metric with a new metric name.

One or more of the following features may be included. The method may further include receiving a selection of at least one numerical value.

Each of the at least one stored metric may be stored by a metric name. The method may further include providing a search feature via the user interface to search for the at least one stored metric via the metric name.

The method may also include adding a new button to the user interface in response to a selection of the at least one stored metric via the search feature.

The at least one stored metric may include stored logic. The method may further include calculating the new metric, including applying the at least one operation to the at least one stored metric including the stored logic.

According to another implementation, a computer program product includes a computer readable medium having a plurality of instructions stored on it. When executed by a processor, the instructions may cause the processor to perform operations including providing a user interface including a calculator with a plurality of buttons. Instructions may also be included for receiving, via the user interface, a selection of at least one stored metric and a selection of at least one operation, resulting in a new metric. Instructions may also be included for storing the new metric with a new metric name.

One or more of the following features may be included. Instructions may be included for receiving a selection of at least one numerical value.

Each of the at least one stored metric may be stored by a metric name. Instructions may be included for providing a search feature via the user interface to search for the at least one stored metric via the metric name.

Instructions may be included for adding a new button to the user interface in response to a selection of the at least one stored metric via the search feature.

The at least one stored metric may include stored logic. Instruction may also be included for calculating the new metric, including applying the at least one operation to the at least one stored metric including the stored logic.

According to another implementation, a system may include at least one processor device and at least one memory architecture coupled with the at least one processor device. The at least one processor device may be configured for providing a user interface including a calculator with a plurality of buttons. The at least one processor may also be configured for receiving, via the user interface, a selection of at least one stored metric and a selection of at least one operation, resulting in a new metric. The at least one processor may further be configured for storing the new metric with a new metric name.

One or more of the following features may be included. The at least one processor may further be configured for receiving a selection of at least one numerical value.

Each of the at least one stored metric may be stored by a metric name. The at least one processor may further be configured for providing a search feature via the user interface to search for the at least one stored metric via the metric name.

The at least one stored metric may include stored logic. The at least one processor may further be configured for calculating the new metric, including applying the at least one operation to the at least one stored metric including the stored logic.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
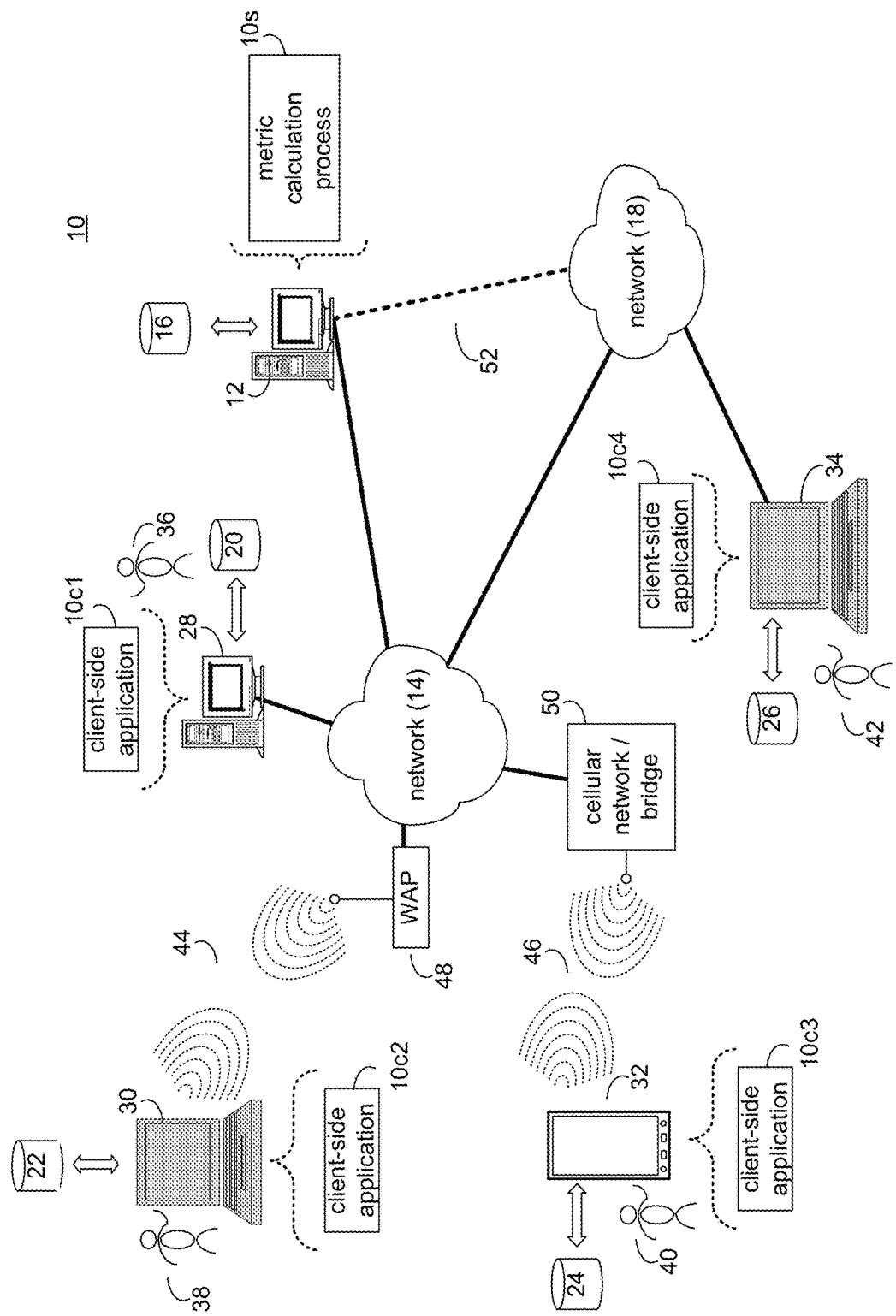
FIG. 1 is a diagrammatic view of a distributed computing network including a computing device that executes a metric calculation process according to an implementation of the present disclosure.

Referring to FIG. 1, there is shown metric calculation process 10. For the following discussion, it is intended to be understood that metric calculation process 10 may be implemented in a variety of ways. For example, metric calculation process 10 may be implemented as a server-side process, a client-side process, or a server-side/client-side process.

For example, metric calculation process 10 may be implemented as a purely server-side process via metric calculation process 10s. Alternatively, metric calculation process 10 may be implemented as a purely client-side process via one or more of client-side application 10c1, client-side application 10c2, client-side application 10c3, and client-side application 10c4. Alternatively still, metric calculation process 10 may be implemented as a server-side/client-side process via metric calculation process 10s in combination with one or more of client-side application 10c1, client-side application 10c2, client-side application 10c3, and client-side application 10c4. In such an example, at least a portion of the functionality of metric calculation process 10 may be performed by metric calculation process 10s and at least a portion of the functionality of metric calculation process 10 may be performed by one or more of client-side application 10c1, 10c2, 10c3, and 10c3.

Accordingly, metric calculation process 10 as used in this disclosure may include any combination of metric calculation process 10s, client-side application 10c1, client-side application 10c2, client-side application 10c3, and client-side application 10c4.

Figure 2:
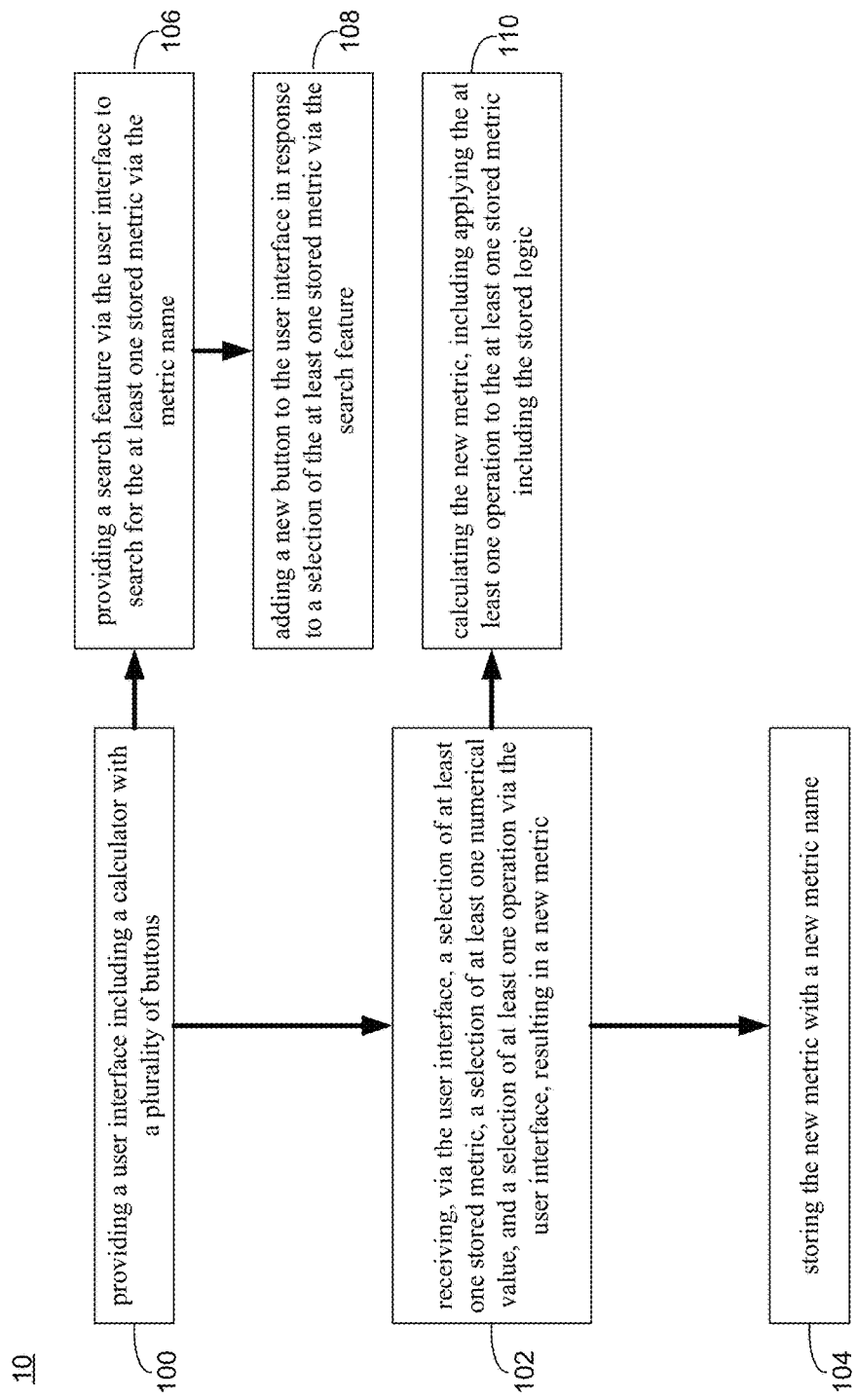
FIG. 2 is a flowchart of the metric calculation process of FIG. 1, according to an implementation of the present disclosure.

Referring also to FIG. 2, and as will be discussed in greater detail below, metric calculation process 10 may provide 100 a user interface including a calculator with a plurality of buttons. Metric calculation process 10 may also receive 102, via the user interface, a selection of at least one stored metric and a selection of at least one operation, resulting in a new metric. Metric calculation process 10 may also store 104 the new metric with a new metric name.

Metric calculation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of metric calculation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access metric calculation process 10 directly through network 14 or through secondary network 18. Further, metric calculation process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 48. Similarly, mobile computing device 32 is shown wirelessly coupled to network 14 via wireless communication channel 46 established between mobile computing device 32 and cellular network/bridge 50, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 44 between laptop computer 30 and WAP 48. Additionally, personal computer 34 is shown directly coupled to network 18 via a hardwired network connection.

As generally discussed above with reference to FIG. 2, metric calculation process 10 may provide 100 a user interface including a calculator with a plurality of buttons. Metric calculation process 10 may also receive 102, via the user interface, a selection of at least one stored metric and a selection of at least one operation, resulting in a new metric. Metric calculation process 10 may also store 104 the new metric with a new metric name.

Figure 3:
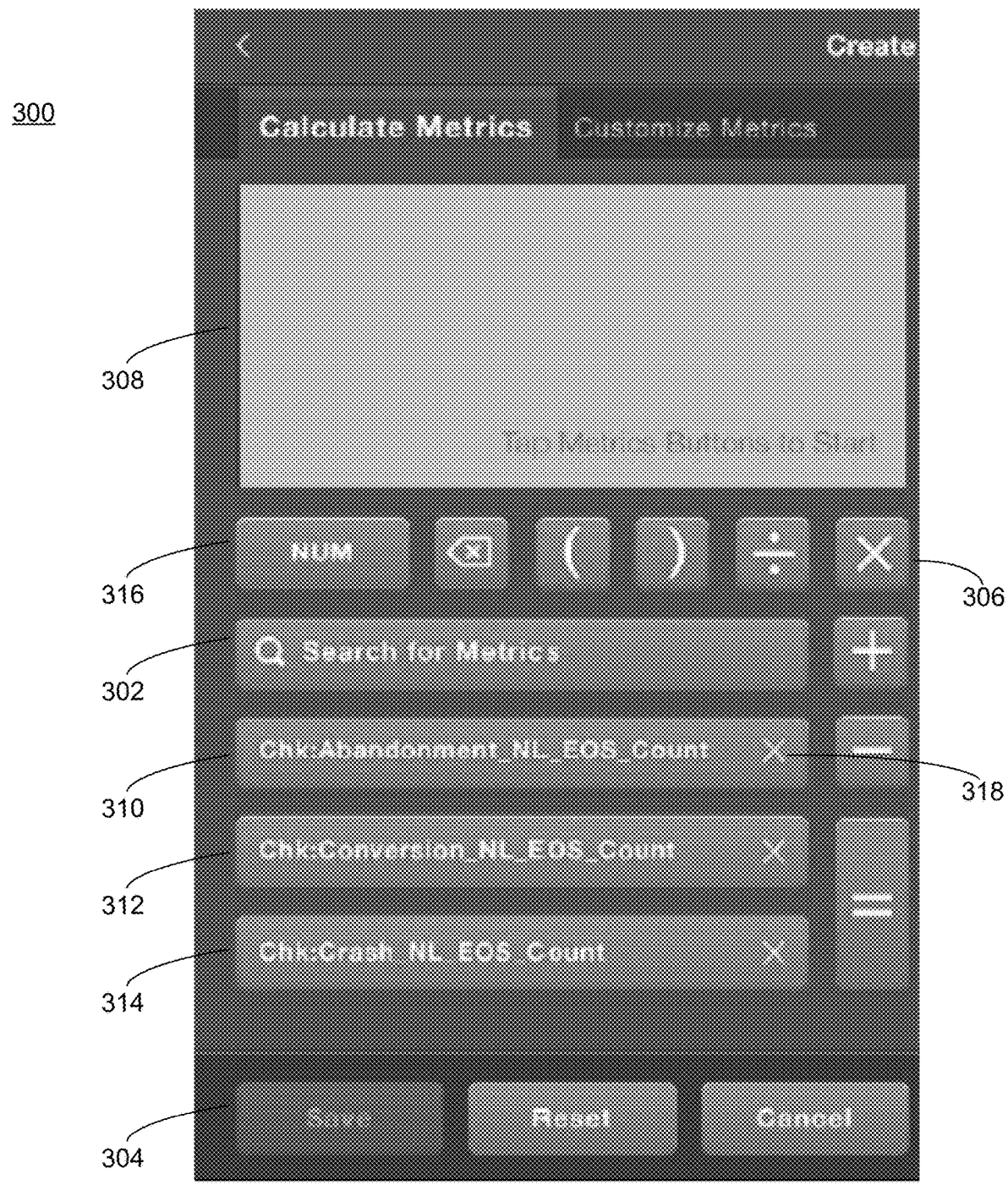
FIG. 3 diagrammatically depicts an implementation of the metric calculation process of FIG. 1, according to an example embodiment.
Figure 4:
FIG. 4 diagrammatically depicts an implementation of the metric calculation process of FIG. 1, according to an example embodiment.
Figure 5:
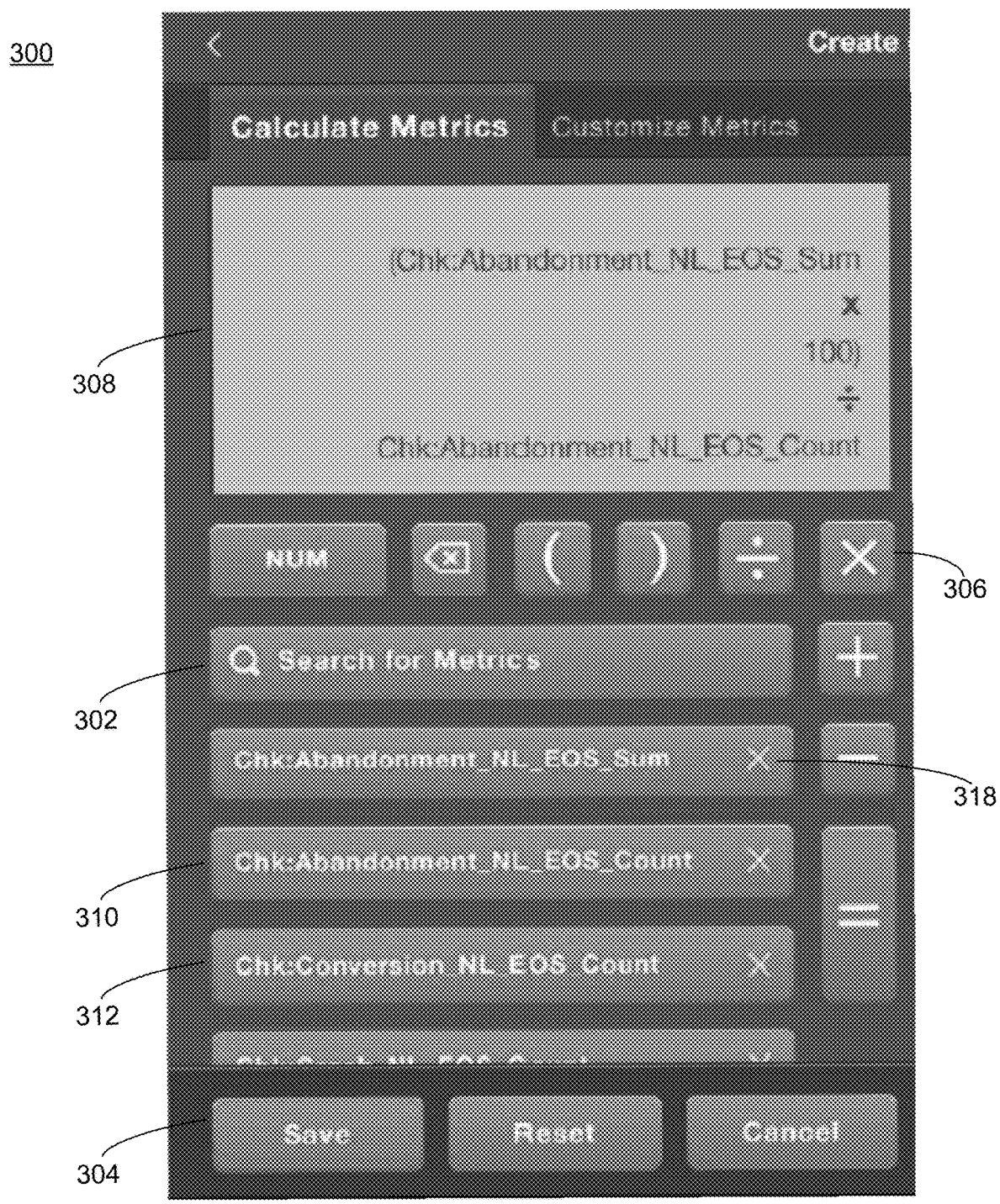
FIG. 5 diagrammatically depicts an implementation of the metric calculation process of FIG. 1, according to an example embodiment.

Metric calculation process 10 may provide 100 a user interface including a calculator with a plurality of buttons. Referring to FIGS. 3-5, metric calculation process 10 may provide 100 user interface 300 including a calculator with a plurality of buttons (e.g., "Search for Metrics" button 302, "Save" button 304, and multiplication operation button 306). Metric calculation process 10 may provide 100 user interface 300 from any application in which metrics may be calculated, such as a report builder in which users (e.g., users 36, 38, 40, and 42) may view and manipulate data. For purposes of this disclosure, a metric may include, but is not limited to, an equation and/or recorded data that may be manipulated using mathematical operations. For example, a web analytics report may show the number of times a particular webpage was viewed in a given time period, the average time spent on the webpage, and the number of unique visitors who visited the webpage. A metric may include a calculated average rate at which a webpage or website is visited per day. Another example of a metric may include a calculated average rate at which a particular link (such as an advertisement or other marketing tool included within a webpage) is selected per hour. These examples are for illustrative purposes only and are not meant to be a limitation of this disclosure. For example, any number of metrics may be created, stored, and/or manipulated based upon, at least in part, any data that has been collected by an application.

A user interface may include one, or often many, different elements that may be presented to a user (e.g., in the form of a user interface display that may be presented to the user via an appropriate display device). The calculator of user interface 300 may include any and all aspects of a traditional calculator including a plurality of buttons representing at least one numerical value (e.g., number "7" button 402) and at least one operation (e.g., multiplication operation button 306). Any number of buttons associated with a traditional calculator may be provided via the user interface. The plurality of buttons may be selected in any manner, including but not limited to, via an onscreen pointer (not shown) that may be controlled by a pointing device (not shown). The user may interact with various elements of the user interface for the purpose of operating the calculator and/or utilizing functionality provided by the calculator in relation to the application from which the user interface was accessed from, such as a report builder. That is, for example, the calculator may include a tool or functionality that may be provided from within, or in connection with, another application.

In an embodiment, metric calculation process 10 may receive 102, via the user interface, a selection of at least one stored metric and a selection of at least one operation, resulting in a new metric. For example, button 310 may represent the stored metric named "Chk:Abandonment_NL_EOS_Count". Metric calculation process 10 may receive 102, via user interface 300, the selection of at least one stored metric and the selection of at least one operation. Metric calculation process 10 may also receive the selection of at least one numerical value. For example and as shown in FIG. 5, metric calculation process 10 may receive 102 and display (e.g., via display 308) the selection of the at least one operation (e.g., the open parenthesis symbolized by "(")) via user interface 300. A selection of the at least one stored metric may also be received 102 and displayed (e.g., the stored metric named "Chk:Abandonment_NL_EOS_Sum" as displayed in display 308) via user interface 300. Another selection of at least one operation may be received 102 and displayed (e.g., the multiplication operation symbolized by "x") via user interface 300. A selection of the at least one numerical value may also be received 102 and displayed (e.g., the numerical value of "100") via user interface 300. A closed parenthesis operation may then be received 102, following by a division operation, and stored metric "Chk:Abandonment_NL_EOS_Count", all of which may be displayed on display 308 via user interface 300.

Metric calculation process 10 may pre-populate user interface 300 with at least one stored metric based upon, at least in part, the application from which user interface 300 was accessed. For example, the at least one stored metric may be automatically populated within user interface 300 based upon, at least in part, a plurality of factors including, but not limited to, prior use of that particular stored metric, common use of that particular stored metric in connection with the application from which user interface 300 was accessed, and/or administrator settings. For example, metric calculation process 10 may automatically provide stored metric "Chk:Abandonment_NL_EOS_Count" button 308 within user interface 300 based upon, at least in part, prior use of that particular stored metric and/or common use of that particular stored metric in association with the application from which user interface 300 was accessed from.

Figure 6:
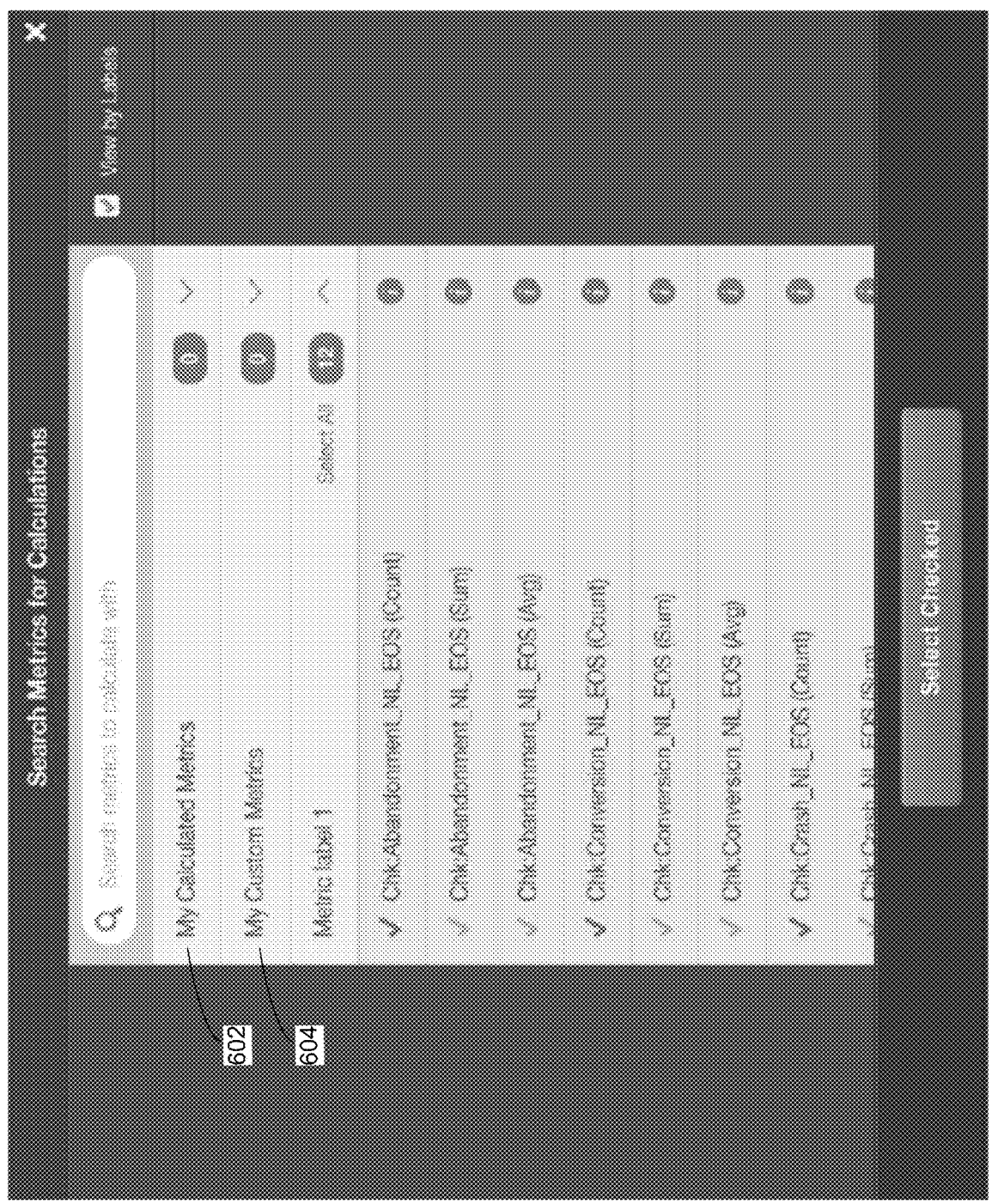
FIG. 6 diagrammatically depicts an implementation of the metric calculation process of FIG. 1, according to an example embodiment.

In an embodiment, metric calculation process 10 may provide 106 a search feature via the user interface to search for the at least one stored metric via the metric name. If a user (e.g., user 36) is looking for a particular stored metric that was not automatically populated, the user may choose to search for all stored metrics associated with the application from which user interface 300 was accessed from or other applications. Metric calculation process 10 may provide 106 search feature (e.g., "Search for Metrics" button 302) within user interface 300 to allow user 36 to search for other stored metrics. As shown in FIG. 6, if user 36 selects button 302, metric calculation process 10 may render a list of stored metrics. Metrics may be stored within a database and/or storage device (e.g., storage device 16) accessible by metric calculation process 10. In this manner, user 36 may search for and select one or more stored metrics. Searching for the stored metrics may include, but is not limited to, scrolling through the list of stored metrics and/or searching by the metric name. User 36 may then select specific stored metrics from the list of stored metrics. While check marks are shown in FIG. 6 to indicate selected stored metrics, this is for illustrative purposes only and is not intended to be a limitation of this disclosure. For example, any symbol or indication may be used to display selected stored metrics within the list of stored metrics.

Metric calculation process 10 may add 108 a new button to the user interface in response to a selection of the at least one stored metric via the search feature. While not shown, each stored metric selected from the list of stored metrics may be added 108 to user interface 300 as a new button, such as the plurality of buttons representing the at least one stored metric provided via user interface 300 (e.g., "Chk:Abandonment_NL_EOS_Count" button 310, "Chk:Conversion_NL_EOS_Count" button 312, and "Chk:Crash_NL_EOS_Count" button 314). In a similar manner, each selected stored metric may be deleted (by selection of "X" button 318) from user interface 300, such that the selected stored metric may no longer be displayed via user interface 300 for selection.

The at least one stored metric may include stored logic. Stored logic may include one or more instructions, equations, mathematical operations, and/or algorithms associated with the at least one stored metric. As a general example, the at least one stored metric may include calculating an average rate at which a webpage or website is visited per day. The stored logic associated with the at least one stored metric may include one or more instructions, equations, mathematical operations, and/or algorithms to calculate the average rate at which the webpage or website is visited per day. For example, the number of times the webpage is visited per hour may be multiplied by 24 to calculate the number of times the webpage is visited per day. These instructions and mathematical operations may all be stored as logic associated with the at least one stored metric.

Metric calculation process 10 may calculate 110 the new metric, including applying the at least one operation to the at least one stored metric including the stored logic. If at least one numerical value was received, then metric calculation process 10 may also calculate 110 the new metric by applying the at least one operation to the at least one stored metric and the at least one numerical value. The new metric may be calculated 110 based upon the order of mathematical operations. Each selection received 102 of the at least one stored metric, the at least one numerical value, and/or the at least one operation may be calculated 110 based upon the order of mathematical operations. In the example of FIG. 5, the multiplication of the at least one stored metric "Chk:

Abandonment_NL_EOS_Sum" by the numerical value of "100" may be calculated 110 first, resulting in a product. This product may then be divided by the at least one stored metric "Chk:Abandonment_NL_EOS_Count", resulting in a calculation 110 of the new metric.

Figure 7:
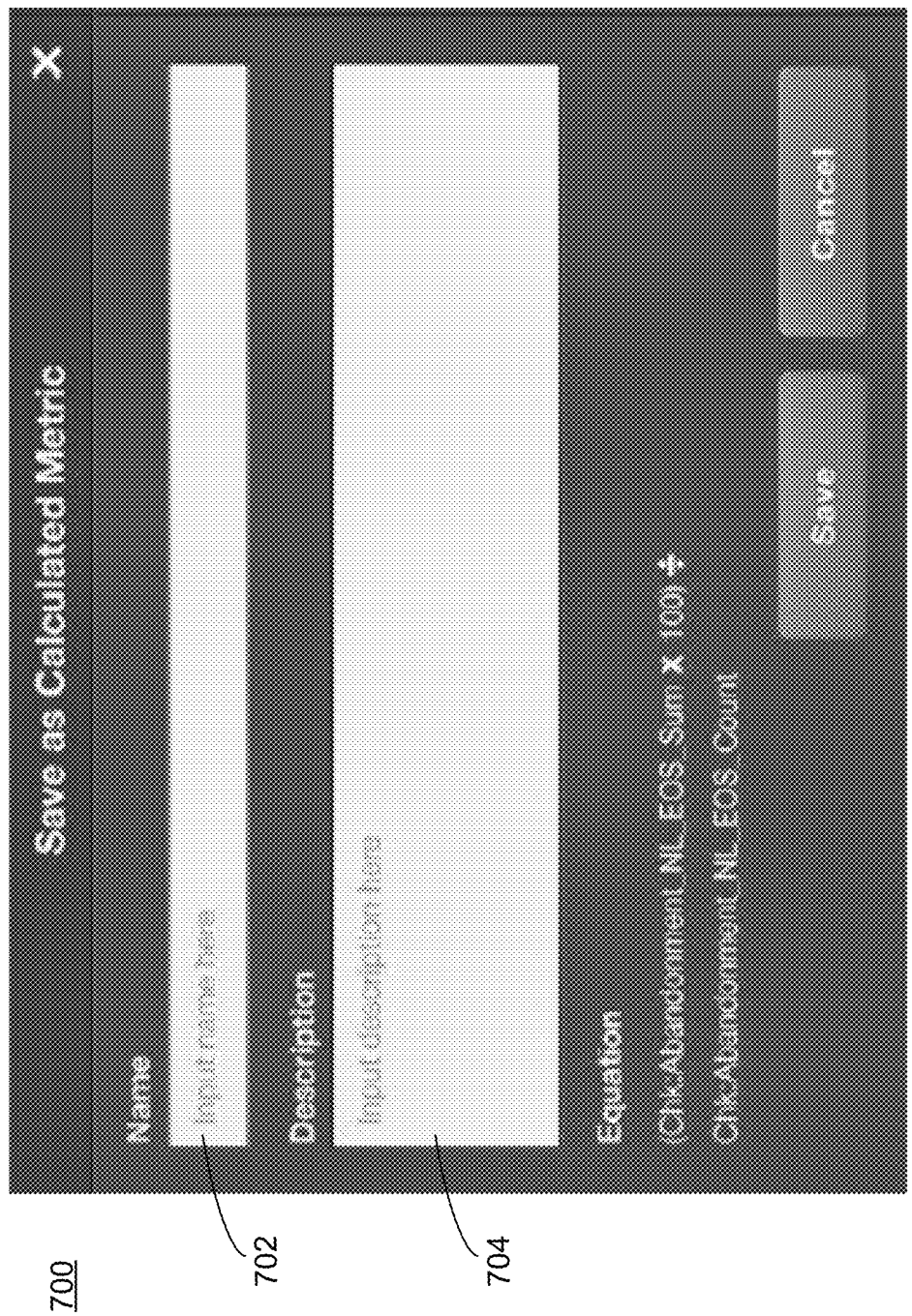
FIG. 7 diagrammatically depicts an implementation of the metric calculation process of FIG. 1, according to an example embodiment.

Metric calculation process 10 may store 104 the new metric with a new metric name. If user 36 would like to store 104 the new metric for later use, user 36 may select "Save" button 304. Referring to FIG. 7, upon receiving an indication to store 104 the new metric (e.g., upon receiving selection of "Save" button 304), metric calculation process 10 may provide pop-up 700 with text fields (e.g., text fields 702 and 704) to allow user 36 to input the new metric name (e.g., via text field 702) and a description of the new metric (e.g., via text field 704) to be associated with the new metric. The new metric may also be displayed within pop-up 700. The new metric may be stored in a database and/or storage device (e.g., storage device 16) along with the other stored metrics. In this way, the new metric may be available for later use such that user 36 or other users accessing user interface 300 from the same or different application may not be required to manually enter and calculate 110 the new metric again in a later session.

Figure 8:
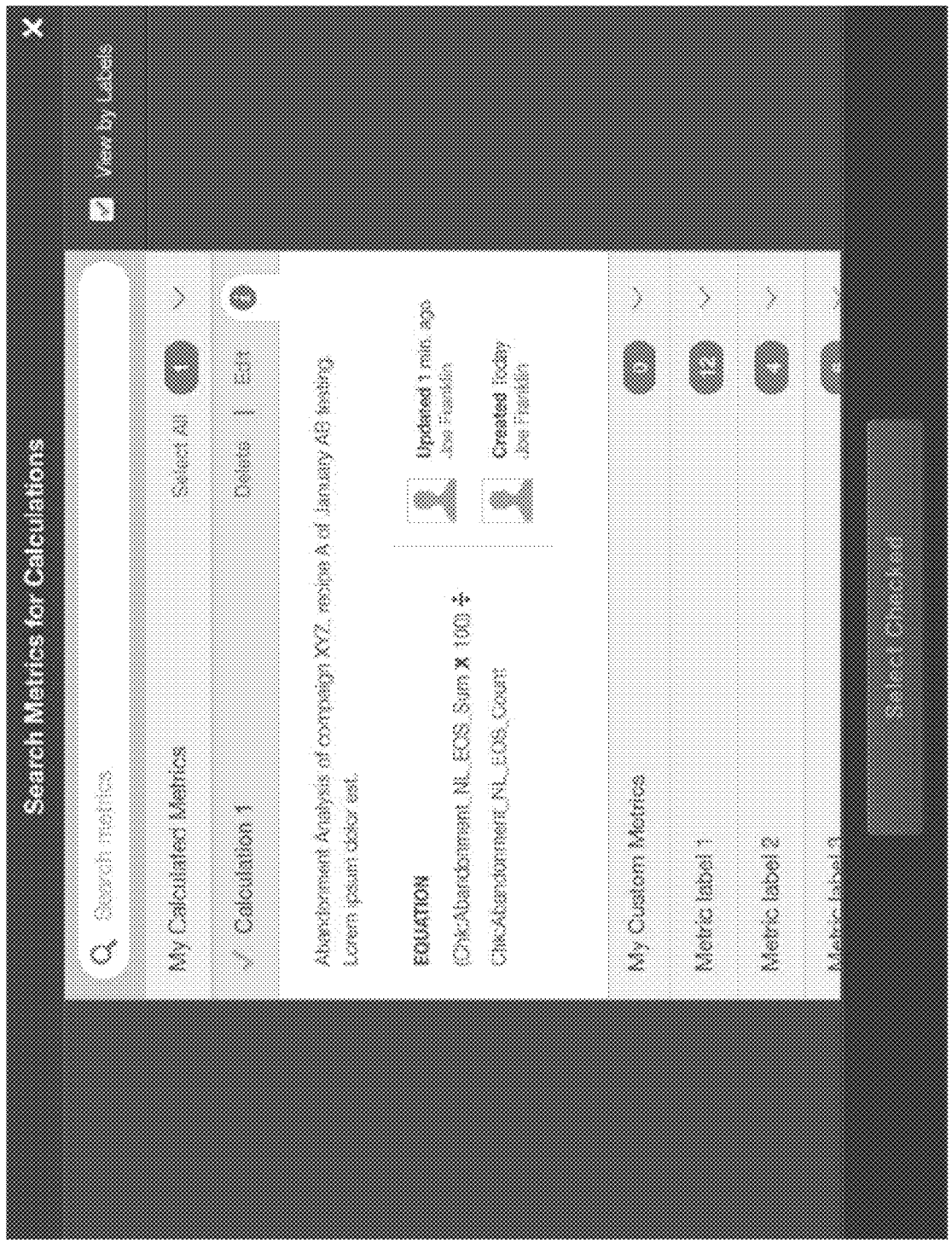
FIG. 8 diagrammatically depicts an implementation of the metric calculation process of FIG. 1, according to an example embodiment.

Referring to FIG. 8, each stored metric may be associated with the user that initially created the stored metric. Metric calculation process 10 may provide options to a user to update, edit, and/or delete each stored metric associated with that user. For example, Joe Franklin (e.g., user 36) may have stored 104 the new metric with the new metric name of "Calculation 1". FIG. 8 provides an example of a user interface displaying a description of the stored 104 new metric, the equation associated with the stored 104 new metric, when the stored 104 new metric was initially created, and each time the stored 104 new metric is updated, including a date and time stamp of each update. A similar view may be available for each stored metric associated with Joe Franklin. This user interface may be accessible from the list of stored metrics (as shown in FIG. 6) via "My Calculated Metrics" link 602 and/or "My Custom Metrics" link 604. Metric calculation process 10 may also allow users to manipulate and customize stored metrics that were stored by other users in order to customize the stored metrics to satisfy the users' needs.

In an embodiment, metric calculation process 10 may receive an indication to interchangeably switch the user interface from visually providing the plurality of buttons with numerical values to visually providing the plurality of buttons with a list of selected stored metrics. As shown in FIG. 3, a plurality of buttons representing a plurality of selected stored metrics and operations are provided and displayed. User interface 300 does not include any buttons representing numerical values in FIG. 3. Rather, "NUM" button 316 is provided. If user 36 selects "NUM" button 316 (as shown in FIG. 3), metric calculation process 10 may receive an indication to switch user interface from visually providing the plurality of buttons with a list of selected stored metrics to visually providing the plurality of buttons with numerical values, as shown in FIG. 4. Similarly, if user 36 selects "METRICS" button 402 (as shown in FIG. 4), metric calculation process 10 may receive an indication to switch user interface from visually providing the plurality of buttons with numerical values to visually providing the plurality of buttons with a list of selected stored metrics, as shown in FIG. 3. This is for illustrative purposes only and is not intended to be a limitation of this disclosure. For example, the plurality of buttons with numerical values and the plurality of buttons with the list of selected stored metrics may all be visually provided and displayed in the user interface without requiring a user to interchange between the two displays.

Metric calculation process 10 may allow users to create new metrics by performing mathematical calculations on existing metrics without requiring that users manually type each metric or equation or write any computer code. The user interface may provide users with a calculator to create calculated metrics. In addition to numerical value buttons and mathematical operator buttons, the user interface may include buttons with names of selected stored metrics. Users may search for a particular stored metric via the user interface. Rather than requiring users to type the metric name, metric calculation process 10 may allow users to simply click a button to include the stored metric in the user interface to use concurrently with the other buttons of the calculator and user interface. In this way, users may create, calculate, and store new metrics and access and manipulate previously stored metrics for later use. New metrics may be created and calculated based upon, at least in part, at least two previously stored metrics and at least one operation, or they may be created and calculated based upon, at least in part, at least one previously stored metric, at least one numerical value, and at least one operation.

Figure 9:
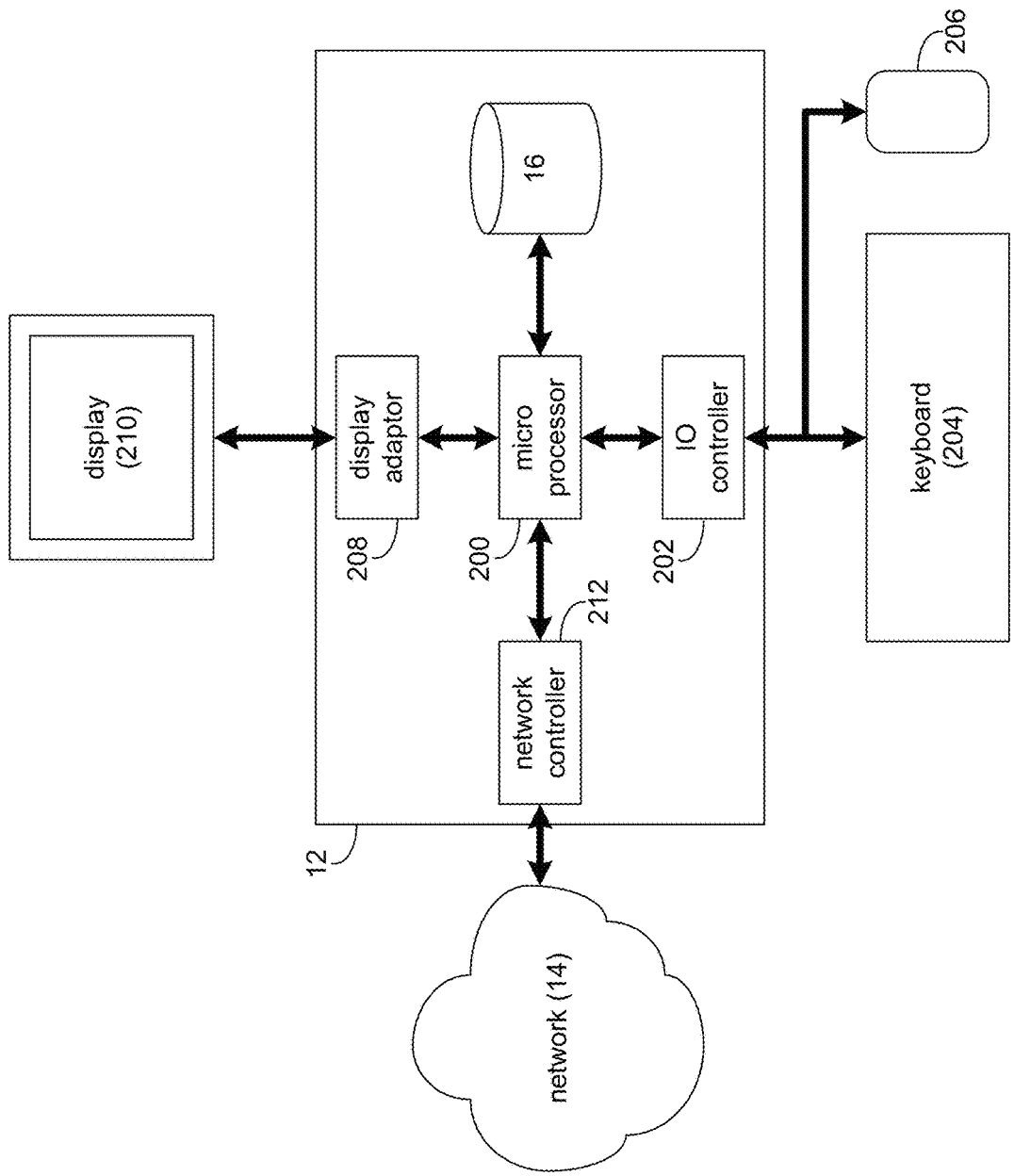
FIG. 9 is a diagrammatic view of the computing device of FIG. 1, according to an implementation of the present disclosure.

Referring also to FIG. 9, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, metric calculation process 10 may be substituted for computing device 12 within FIG. 9, examples of which may include but are not limited to client electronic devices 28, 30, 32, 34.

Computing system 12 may include microprocessor 200 configured to e.g., process data and execute instructions/code for metric calculation process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
providing in an application, by a processor, a user interface including a calculator with a plurality of buttons including an automatically prepopulated stored metric, wherein the stored metric is automatically prepopulated differently in the application relative to another application;
providing a search feature via the user interface to search for at least one stored metric via a metric name;
receiving, by the processor and via the user interface, a selection via the search feature of at least one stored metric and a selection of at least one operation;
adding a new button to the user interface in response to the selection of the at least one stored metric via the search feature;
calculating a new metric based on the at least one stored metric and the at least one operation; and
storing, by the processor, the new metric with a new metric name.

2. The computer-implemented method of claim 1, further including:
receiving a selection of at least one numerical value.

3. The computer-implemented method of claim 1, wherein each of the at least one stored metric is stored by a metric name.

4. The computer-implemented method of claim 1 wherein the at least one stored metric includes stored logic.

5. The computer-implemented method of claim 1, further including:
calculating the new metric, including applying the at least one operation to the at least one stored metric including the stored logic.

6. A computer program product comprising one or more non-transitory computer readable media having a plurality of programming instructions stored thereon for execution by one or more processors to perform a method, the programming instructions comprising instructions for:
providing, in an application, a user interface including a calculator with a plurality of buttons including an automatically prepopulated stored metric, wherein the stored metric is automatically prepopulated differently in the application relative to another application;
providing a search feature via the user interface to search for at least one stored metric via a metric name;
receiving, via the user interface, a selection via the search feature of at least one stored metric and a selection of at least one operation;
adding a new button to the user interface in response to the selection of the at least one stored metric via the search feature;
calculating a new metric based on the at least one stored metric and the at least one operation; and
storing the new metric with a new metric name.

7. The computer program product of claim 6, further including:
receiving a selection of at least one numerical value.

8. The computer program product of claim 6, wherein each of the at least one stored metric is stored by a metric name.

9. The computer program product of claim 6, wherein the at least one stored metric includes stored logic.

10. The computer program product of claim 6, further including:
calculating the new metric, including applying the at least one operation to the at least one stored metric including the stored logic.

11. A system comprising:
one or more processors; and
one or more tangible storage media storing programming instructions for execution by the processor to perform a method, the programming instructions comprising instructions for:
providing, in an application, a user interface including a calculator with a plurality of buttons including an automatically prepopulated stored metric, wherein the stored metric is automatically prepopulated differently in the application relative to another application;
providing a search feature via the user interface to search for at least one stored metric via a metric name;
receiving, via the user interface, a selection via the search feature of at least one stored metric and a selection of at least one operation;
adding a new button to the user interface in response to the selection of the at least one stored metric via the search feature;
calculating a new metric based on the at least one stored metric and the at least one operation; and
storing the new metric with a new metric name.

12. The system of claim 11, wherein the programming instructions further comprise instructions for:
receiving a selection of at least one numerical value.

13. The system of claim 11, wherein the at least one stored metric is stored by a metric name.

14. The system of claim 11, the programming instructions further comprise instructions for:
calculating the new metric, including applying the at least one operation to the at least one numerical value and the at least one stored metric including the stored logic.

* * * * *